United States Patent [19]
Thoma et al.

[11] 3,708,863
[45] Jan. 9, 1973

[54] METHOD OF MAKING A TEMPERATURE SENSING ELEMENT

[75] Inventors: Paul E. Thoma, Burlington; Frederick A. Hoffmann, Milwaukee, both of Wis.

[73] Assignee: Johnson Service Company, Milwaukee, Wis.

[22] Filed: July 23, 1970

[21] Appl. No.: 57,510

[52] U.S. Cl. ..........................29/454, 29/573, 29/578
[51] Int. Cl. ...............................................B32b 15/00
[58] Field of Search........................29/454, 557–558, 29/631, 578, 573

[56] References Cited

UNITED STATES PATENTS 3,461,723  8/1969  Thoma....................................73/335
3,574,933  4/1971  Cassingham.......................29/631 X Primary Examiner—Charles W. Lanham
Assistant Examiner—Daniel C. Crane
Attorney—Andrus, Sceales, Starke & Sawall and Arnold J. De Angelis

[57]  ABSTRACT

A method of making a temperature sensing element from a composite sheet composed of two or more layers of materials having different coefficients of thermal expansion. To fabricate the element, a portion of one layer is masked, while a second portion of the layer is exposed and is removed by chemical or electrolytic action to provide an element in which one layer has a substantially greater surface area than the other layer. The element is shaped to the desired size and configuration and in use the element is mounted so that the peripheral edge is rigidly attached and sealed to a mounting support.

5 Claims, 4 Drawing Figures

PATENTED JAN 9 1973

3,708,863

INVENTOR.
Paul E. Thoma
Frederick A. Hoffmann
BY
Andrus, Sceales, Starke & Sawall
Attorneys

METHOD OF MAKING A TEMPERATURE SENSING ELEMENT

This invention relates to a temperature sensing element and more particularly to a method of making a temperature sensing element from a composite sheet of material.

Bimetallic temperature sensors are used in a variety of configurations, the more common types include cantilever, U-shape, spiral or helical coil, and simply supported circular discs. The configuration to be used is generally governed by the application. For example, cantilever bimetallic temperature sensing elements have a proportional deflection as a function of temperature and are generally used in adjustable thermostats. Simply supported circular discs, on the other hand, are generally designed for use in snap action applications.

The copending United States patent application Ser. No. 720,684 filed, Apr. 11, 1968, now U.S. Pat. No. 3,665,765 describes a type of sensor in the shape of a disc which is rigidly mounted to a supporting structure. With this type of sensor a proportional central deflection occurs as a function of the condition being sensed.

The present invention is directed to an improved method of making a multi-layer, disc-type, temperature sensor which is adapted to be rigidly mounted to a supporting frame. The element is formed from a composite sheet composed of a base layer and one or more outer layers which have a smaller area than the base layer and are located generally symmetrically with respect to the center or axis of the base layer. The base layer and the outer layers have different coefficients of thermal expansion, and with the peripheral edge of the base rigidly mounted to a support, a proportional central deflection of the base layer occurs as a function of the temperature being sensed.

The element can be shaped in a variety of configurations such as a disc, wafer, cup or strip.

The temperature sensing element is fabricated from a composite sheet composed of the base layer material and the outer layer material. According to the method of the invention, selected areas of the outer layer material are masked and other areas, where it is desired to remove the outer layer material, are exposed. The masked composite sheet is then exposed to a medium which will chemically attack and remove the exposed portions of the outer layer material. After removal of the exposed portions of the outer layer material, the masking is removed and the resulting element is shaped to the desired size or configuration.

The method of the invention provides a multi-layer, temperature sensing element formed from a composite sheet in which the layers are integrally bonded together preferably by a metallurgial bond. If adhesives are employed in forming the composite sheet, they become a part of the system and have to be considered when determining the sensitivity of the element. As a further consideration, variations in the thickness of an adhesive layer can effect the sensitivity of the element with the result that there may be some element-to-element variations in sensitivity when using an adhesive bond.

As a further advantage, it is possible to precisely remove selected areas of the outer layer material, depending on the desired configuration. By use of a master form for masking, uniform removal of the second layer material can be obtained from element-to-element with the result that minimum calibration of the element is required.

Other objects and advantages will appear in the course of the following description.

The drawings illustrate the best mode presently contemplated of carrying out the invention.

Figure 1:
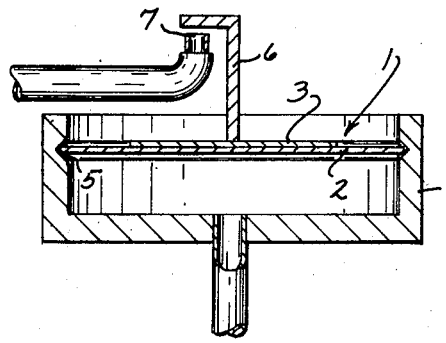
FIG. 1 is a diagrammatic representation of the temperature sensing element of the invention, as mounted in a pneumatic control system.
Figure 2:
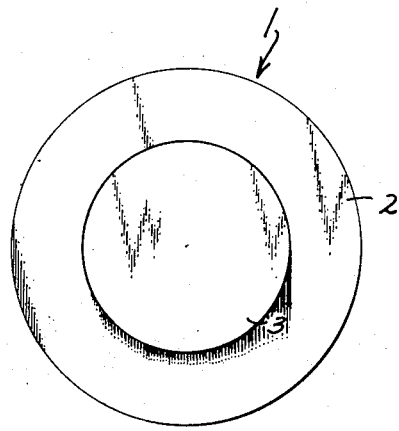
FIG. 2 is a plan view of the element shown in FIG. 1.

As illustrated in FIG. 1, the temperature sensing element 1 has a disc-like shape and comprises a base layer 2 and a circular outer layer 3 which has a substantially lesser area than the base layer 2. The peripheral edge of the base layer 2 of the element is rigidly secured within a groove in a supporting frame 4 by solder or brazing 5.

The element 1 is installed in a fluid control system and in this regard a stem 6 is secured to the central portion of the outer layer 3 and the outer end of the stem 6 is adapted to control the flow of fluid through an orifice 7 of the fluid control system, similar to the manner described in the United States copending application Ser. No. 24,307 filed Mar. 31, 1970.

The base layer 2 and outer layer 3 have substantially different coefficients of thermal expansion and the material combinations that can be used for the layers 2 and 3 are numerous and include, but are not limited to, the following systems: Invar-copper, Invar-brass, Invar-manganese alloy (72% Mn, 18% Cu, 10% Ni), Invar-high thermal expansion glass (potash soda lead glass), copper-low thermal expansion glass (96% silica glass), and metal or glass-polymer systems (Invar-polysulfone, stainless steel-polyphenylene oxide, low thermal expansion glass-polycarbonate, etc.).

In the systems as illustrated in FIG. 1, the coefficient of thermal expansion of the layer 3 is greater than that of the base layer 2, causing an upward deflection in the element 1 on an increase in temperature. However, it is not essential that the coefficient of expansion of the outer layer 3 be greater than that of the base layer 2, and depending on the mounting arrangement and the nature of the control system, the coefficient of thermal expansion of the base layer 2 can be greater than that of the layer 3.

When using a bimetallic system it is preferred to use Invar as one of the layers, for Invar has a negligible coefficient of thermal expansion, thereby providing a large differential between the coefficients of expansion of the two layers.

The layers 2 and 3 are integrally bonded together. The bond between the layers can be a direct bond, such as a metallurgical bond, or a bond achieved with an intermediate layer, such as solder, brazing alloys or organic adhesives. However, it is preferred that the bond be a direct metallurgical bond, because the presence of a third layer such as solder, brazing alloys, or adhesives becomes a party of the system and will effect the sensitivity of the element.

The thickness of the layers 2 and 3 is not critical and generally, the overall thickness of the element, including layers 2 and 3, will be in the range of 0.006 to 0.030 inch with the layers 2 and 3 each normally comprising one-half of the overall thickness of the element.

Figure 3:
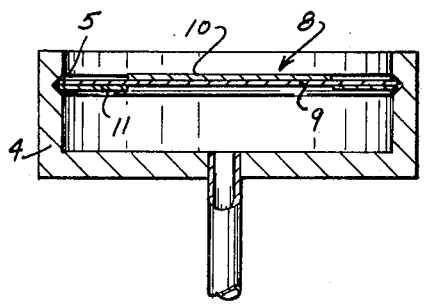
FIG. 3 is a diagrammatic illustration of a modified form of the temperature sensing element of the invention.

FIG. 3 illustrates a modified form of the invention in which the temperature sensitive element 8 includes a generally circular base layer 9 and a pair of outer layers 10 and 11, which are bonded to the opposite surfaces of the base layer 9. As illustrated in FIG. 3, the layer 10 is circular in shape, while the layer 11 has an annular shape and both layers 10 and 11 are symmetrical with respect to the center or axis of the layer 9. The base layer 9 has a different coefficient of thermal expansion than the layers 10 and 11 and the layers 10 and 11 can have the same coefficient of thermal expansion or can have different coefficients. With the structure shown in FIG. 3 it is preferred that the coefficients of expansion of both layers 10 and 11 be greater than the coefficient of the base layer 9 so that the deflection will be upwardly on an increase in temperature. The layers 9, 10 and 11 can be formed of any of the material combinations set forth previously with respect to the first embodiment.

Figure 4:
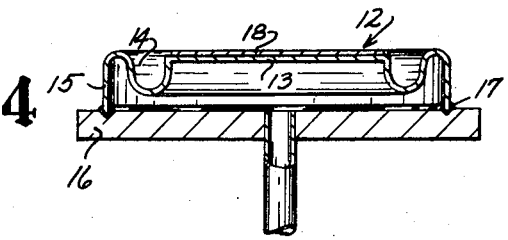
FIG. 4 is a further modified form of the temperature sensing element of the invention.

FIG. 4 illustrates a further modified form of the invention in which the temperature sensitive element 12 is composed of a base member 13 having a double reverse bend in its periphery as indicated by 14. The periphery of the base 13 is provided with a flange 15 which is secured within a groove in a supporting structure 16 by solder 17, or the like to rigidly mount he element with respect to the support. Located centrally on the upper surface of the base 13 is a circular layer 18 which is integrally bonded to the base 13 and, as previously described, has a different coefficient of thermal expansion than the base 13.

The layers 13 and 18 can be formed of any one of the material systems previously described with respect to the embodiment shown in FIG. 1.

The temperature sensing element is prepared from a multi-layer sheet of material. In the case of the element shown in FIGS. 1 and 4, the composite sheet would be formed of two layers, while in fabricating the element shown in FIG. 3, the composite sheet would be formed of three integrally bonded layers corresponding to the layers 9, 10 and 11 in the final element.

In preparing the bi-layer element of FIGS. 1 or 4, a predetermined area of the outer layer of the composite sheet, corresponding to layer 3 or 18 in the final element, is masked, while a second portion of that layer is exposed. The maskants include, but are not limited to, photosensitive resists, tape, paint, rubber or plastic cement and plated deposits. After masking, the composite sheet is exposed to a fluid medium that will chemically and/or electrolytically remove the unmasked or exposed portion of the layer. After the unmasked portion has been completely removed, the masking is removed and the resulting element is formed into the desired shape or configuration. The shaped element is then mounted, as shown in the drawings, so that the peripheral edge of the element is rigidly clamped and sealed to a supporting structure.

In preparing the three component structure of FIG. 3, a similar procedure would be carried out for each surface of the composite sheet to provide the layers 10 and 11 on the base layer 9.

The following examples illustrate the temperature sensing element of the invention and the method of preparing the same.

EXAMPLE NO. 1

In preparing the temperature sensing element similar to FIG. 4, the design of the sensor is laid out on a transparent sheet of Mylar (polyester) film and a central circular area of the design where material removal is not desired was made opaque with either tape or ink. A photographic negative was made of the art work using a contact print method and the resulting negative had a transparent central circular portion bordered by an opaque annular portion.

A bimetallic sheet composed of a 0.005 inch layer of Invar and a 0.005 inch layer of a manganese alloy (72% Mn, 18% Cu, 10% Ni) was thoroughly cleaned with acetone and was then dipped into a dilute phosphoric acid solution (6 ml. phosphoric acid — 85% $H_3PO_4$ and 294 ml of deionized water) for approximately 30 seconds to increase adhesion between the optically active polymer to be subsequently applied to the manganese alloy.

The sheet was then coated with an optically active polymer (Kodak Photo Resist KPR) in a room with a yellow safe-light and the coated sheet was hung for 30 minutes to permit the coating to dry. The photograph negative was then placed over the coated bimetallic sheet in contact with the manganese alloy side and an ultra-violet lamp with a peak radiation of 350 millimicrons was placed approximately 4 inches above the top of the vacuum frame holding the bimetallic sheet. The photosensitive coating was exposed to the ultra-violet radiation for 15 minutes and the portion of the photosensitive coating not protected by the opaque areas of the negative was crosslinked by the ultra-violet radiation, while the protected sections remained uncrosslinked.

After exposure to the ultra-violet radiation, the bimetallic sheet was placed in trichloroethylene for 2 minutes. The uncrosslinked areas of the photosensitive coating were dissolved by the solvent, but the crosslinked areas were not attacked, the result being that the crosslinked photosensitive coating covered those areas of the manganese alloy layer not to be attacked by the etching solution. After removal of the bimetallic sheet from the solvent, it was permitted to stand undisturbed for five minutes to permit evaporation of the solvent. After evaporation, the sheet was baked at 350°F for 10 minutes to fully harden the protective photosensitive coating.

The bimetallic sheet with the protective photosensitive coating covering a certain selected area was then placed in a chemical etching solution at room temperature consisting of the following:

30 grams ferric chloride
90 ml. hydrochloric acid
360 ml. deionized water

The sheet was exposed to the etching solution for approximately 20 minutes and after this period of time the exposed portion of the manganese alloy was completely removed. The bimetallic sheet was then removed from the etching solution, rinsed with water and dried.

In the particular system utilized in Example No. 1, a residue remaining in the etched areas underwent a spontaneous exothermic reaction when exposed to air. The residue consisted of approximately 61 percent copper, 10 percent nickel, 7 percent manganese and the balance iron. The residue was removed by electrolytic means in which the sheet was made the anode in an electrolytic bath, a graphite cathode was employed, and the electrolytic solution consisted of the following:

250 ml of hydrochloric acid
250 ml deionized water
25 ml glycerine.

Utilizing a potential of 2 volts, the residue was removed in about one minute and the blank was then rinsed in water and dried.

The sheet was then fabricated into final shape, which was a cup-shape similar to that illustrated in FIG. 4 of the drawings.

EXAMPLE NO. 2

| | |
|---|---|
| Material System: | Invar-brass (60% Cu, 40% Zn) |
| Material Removed: | Brass (60% Cu, 40% Zn) |
| Maskant: | Kodak Photo Resist (KPR) |
| Method of Removal: | Electrolytic Removal |
| Electrolytic solution: | 90 g. Sodium Cyanide (NaCN) |
| | 15 g. Sodium Hydroxide (NaOH) |
| | 1000 ml. Deionized Water |
| Voltage: | 5 volts D.C. |
| Temperature of Electrolytic Solution: | Room Temperature |

EXAMPLE NO. 3

| | |
|---|---|
| Material System: | Invar-copper alloy (99% Cu, 1% Cd) |
| Material Removed: | Copper alloy (99% Cu, 1% Cd) |
| Maskant: | Flexible epoxy resin coating (Hysol PC 17 Std.) |
| Method of Material Removal: | Electrolytic Removal |
| Electrolytic Solution: | 90 g. Sodium Cyanide (NaCN) |
| | 15 g. Sodium Hydroxide (NaOH) |
| | 1000 ml. Deionized water |
| Voltage: | 5 volts D.C. |
| Temperature of Electrolytic Solution: | Room Temperature |

EXAMPLE NO. 4

| | |
|---|---|
| Material System: | Invar-copper alloy (99% Cu, 1% Cd) |
| Material Removed: | Invar |
| Maskant: | Scotch brand pressure sensitive tape No. 470 |
| Method of Removal: | Electrolytic Removal |
| Electrolytic Solution: | 75 ml Hydrochloric acid (22°Beaʎ½) |
| | 20 ml. Glycerine (99.5%) |
| | 425 ml Deionized water |
| Voltage: | 4 volts D.C. |
| Temperature of electrolytic Solution: | Room Temperature |

The method of the invention enables precisely defined selected areas of a layer of the composite sheet to be removed to provide a temperature sensing element having more uniform sensitivity from element-to-element so that minimum calibration is required.

Various modes of carrying out the invention are contemplated as being within the scope of the following claims particularly pointing out and distinctly claiming the subject matter which is regarded as the invention.

We claim:

1. A method of fabricating a temperature sensing element, comprising the steps of bonding two layers of materials having different coefficients of thermal expansion in an intimate face-to-face relation to form a composite sheet, masking a first portion of a first layer of the sheet and a second portion of the first layer being exposed, contacting the second portion of said first layer with a chemical or electrolytic medium capable of attacking and removing said second portion to remove said second portion and provide a composite sheet in which the first layer extends only over a portion of the area of the second layer, and rigidly mounting the peripheral portion of the sheet in a frame such that the first portion of the first layer is generally symmetrical with respect to the frame.

2. The method of claim 1, wherein the masking is accomplished by use of a material selected from the group consisting of tape, paint, adhesives, photosensitive resists and plated deposits.

3. The method of claim 1, where said layers are metals.

4. A method of fabricating a temperature sensing element comprising the steps of bonding to one surface of a base layer a first outer layer of material having a different coefficient of thermal expansion than said base layer, bonding to the opposite surface of the base layer a second outer layer of material having a different coefficient of expansion than said base layer to form a composite sheet, masking a first portion of the first layer and a second portion of the first layer being exposed, subjecting the second portion of the first layer to a medium capable of attacking and removing said second portion to provide a composite sheet in which the remaining first layer extends only over a portion of the area of the base layer, masking the second layer in a manner to provide a first masked zone that is symmetrical with respect to said remaining first layer and to provide a second exposed zone, subjecting said second zone to a medium capable of attacking and removing said second zone to provide a sheet on which the remaining second layer extends over only a portion of the area of the base layer and is generally symmetrical to the remaining first layer, and forming the sheet into the desired configuration for mounting as a temperature sensing element.

5. The method of claim 4, wherein said first portion is annular in shape and said first zone is circular in shape and has a diameter approximately equal to the internal diameter of the annular first portion.

* * * * *